United States Patent Office 2,950,075
Patented Aug. 23, 1960

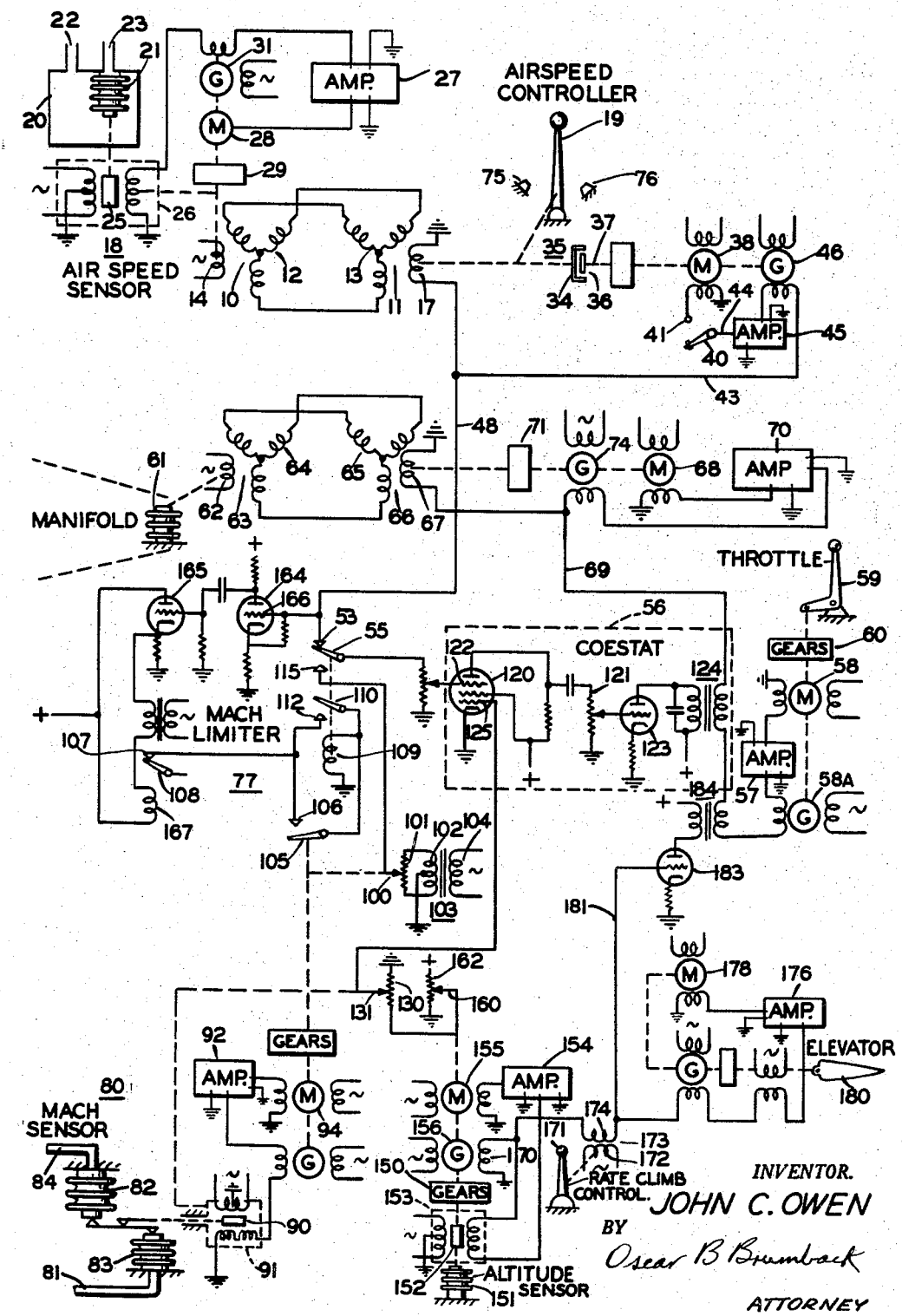

2,950,075
THRUST CONTROL FOR AIRCRAFT

John C. Owen, Grand Rapids, Mich., assignor to The Bendix Corporation, a corporation of Delaware Filed Sept. 22, 1955, Ser. No. 535,872

14 Claims. (Cl. 244—77)

This invention relates generally to automatic control systems for aircraft and more particularly to systems for controlling the thrust developed by the power-plant of an aircraft.

The thrust control channel of an aircraft is often referred to as the airspeed channel. This is due to the fact that, while the airspeed is a function of both the thrust developed by the power-plant and the pitch attitude of the craft, the thrust is normally varied to change the airspeed. Control of thrust or airspeed has heretofore been omitted from the automatic pilot systems which control the craft about the pitch, roll, and yaw axes, except during periods of instrument landing by glide path controls and when the human pilot has controlled the thrust or airspeed by way of the manual throttle control.

An object of the present invention, therefore, is to provide a novel system for automatically controlling the thrust or airspeed of an aircraft.

Another object is to provide a novel control system for the thrust or airspeed control channel of an aircraft wherein a controller is movable manually to set an airspeed which will be maintained automatically.

Another object is to provide a novel system for automatically controlling the thrust of an aircraft so that the craft is prevented from substantially exceeding a predetermined Mach number.

Another object is to provide a novel system for automatically controlling the thrust of an aircraft and for maintaining a manually operable thrust controller in synchronism with the airspeed of the craft when the control system is on a "standby" so as to eliminate the possibility of a transient occurring at the time of engagement.

The foregoing and other objects and advantages of the invention will appear more fully hereinafter from a consideration of the detailed description which follows, taken together with the accompanying sheet of drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically the novel thrust control system of the present invention.

Airspeed is the basic reference in the novel thrust control system of the present invention. Turning to the single sheet of drawing, a pair of inductive devices 10 and 11 constitute a well known transmitter and receiver arrangement. Transmitter stator 12 and receiver stator 13 are connected together and are fixed to the aircraft. Receiver rotor 14 is energized by a suitable source of alternating current and is positioned by an airspeed sensor 18, and rotor 17 is positioned by a manual controller 19.

As is well known, as long as rotors 14 and 17 are in a position of agreement or null position, no signal is developed at rotor 17. Relative displacement of the rotors from this position develops a signal corresponding in phase and amplitude to the direction and extent of the displacement.

Thus, transmitter and receiver inductive devices 10 and 11 act as a signal means which has one part positioned in response to measured airspeed and the other part positioned in response to commanded airspeed. The signal developed at rotor 17 corresponds in phase and amplitude to the direction and extent of the error between the commanded and measured airspeed.

The airspeed sensor 18 for positioning rotor 14 may be a conventional type having a case 20 and a diaphragm assembly 21 within the case. A pitot static line 22 leads to the exterior and a pitot impact line 23 leads to the interior of the diaphragm assembly. The difference in pressures expands the diaphragm assembly, thereby positioning slug 25 relative to a balanced transformer 26. If the transformer be unbalanced, the resulting signal through an amplifier 27 operates an induction motor 28. Through a suitable gear train 29 the motor 28 drives the transformer to rebalance it and at the same time positions rotor 14 of inductive device 10. A conventional rate generator 31 damps the motor operation.

The manual controller 19 for positioning rotor 17 also positions one face 34 of a friction clutch 35 whose other face 36 is positioned by the shaft 37 driven by an induction motor 38. This motor synchronizes the position of manual controller 19 with the airspeed of the craft during the period that the craft is under manual control of the human pilot and the automatic control system is energized but is not engaged to control the throttles. At this time, armature 40 is in engagement with contact 41 to energize motor 38. Thus, any signal due to the positional difference of rotors 14 and 17 is transmitted by leads 43 and 44 and amplifier 45 to the variable phase winding of motor 38. As a result the motor drives controller 19 and rotor 17 into a position of agreement with rotor 14. A conventional rate generator 46 damps the motor operation.

During the period that the automatic control system is engaged to control the throttles, armature 40 is disengaged from contact 41 and motor 38 is deenergized. At that time, the position of rotor 17 is fixed at some commanded airspeed by the frictional drag between faces 34 and 36 of friction clutch 35 holding manual controller 19 in its last position. Any difference between the airspeed commanded by controller 19 and the airspeed measured by airspeed sensor 18 manifests itself at rotor 17 as a signal which is transmitted by way of lead 48, contact 53 and armature 55 and coestat 56 to the servo amplifier 57. The signal is discriminated as to its phase in amplifier 57 and its amplitude raised to a level to operate an induction motor 58 to displace throttle 59 through gear train 60. A conventional rate generator 58A damps the motor operation.

So that the extent of throttle 59 movement will correspond to the change in thrust required to cause the measured airspeed to agree with the commanded airspeed, the power developed at the power plant for the aircraft is measured to provide a follow-up. In a conventional supercharged aircraft engine of an internal combustion reciprocating type with which the thrust control is adapted for use, the throttle 59 controls pressure in an air intake manifold to the engine and the thrust or power output developed by the engine varies directly with the air intake manifold pressure to the engine. Thus, the engine air intake manifold pressure is proportional to the power developed by the power-plant and is sensed by a conventional aneroid 61 which positions the energized rotor 62 of a transmitter inductive device 63. The stator 64 of inductive device 63 is connected to the stator 65 of a receiver inductive device 66 whose rotor 67 is positioned by a motor 68. Thus, any change in the engine air intake manifold pressure results in the development at rotor winding 67 of a signal which is applied by way of lead 69 to amplifier 57 in opposition to the airspeed error signal so that the throttle 59 is positioned by motor 58 until the change in manifold pressure controlled by the throttle 59 causes the aneroid 61 to so adjust rotor 62 that the transmitter inductive device 63 develops a signal equal and opposite to the error signal developed at the receiver inductive device 66, whereupon the motor 58 stops.

As the thrust developed by the power-plant of the aircraft is changed, the airspeed changes and airspeed sensor 18 brings rotor 14 into positional agreement with the rotor 17 that is positioned by manual controller 19. At the same time, the signal from rotor 67 is applied through amplifier 70 to the variable phase winding of motor 68 to drive rotor 67 by way of a suitable gear train 71 into positional agreement with rotor 62 and cancel the signal developed at rotor 67. Since the motor 68 also drives the rotor of a rate generator 74 which has a high output value, the motor 68 operates to cancel the manifold pressure signal at a rate corresponding to the amplitude of the signal.

In the operation of the apparatus so far described, the bellows 21 of airspeed device 18 in response to a difference between impact and static pressures displaces the slug 25 of a balanced transformer 26 to develop a corresponding signal. Applied to amplifier 27, this signal operates motor 28 in a direction to rebalance the transformer and, at the same time, displace rotor 14 of inductive transmitter device 10. Thus, the position of rotor 14 at any time corresponds to the measured airspeed.

A synchronizing system is provided to maintain the rotor 17 of inductive device 11 in positional agreement with rotor 14 when the system is energized but is not placed in control of the craft. To this end, armature 40 is engaged with contact 41 so that any error signal from rotor 17 energizes motor 38 to drive the rotor to a null position. Thus, motor 38, at the same time, places controller 19 in a position it would occupy were it actually controlling the craft. The position of the controller being synchronized with the measured airspeed, the control channel may be placed in control of thrust at any time without transients.

When the craft is to be placed under automatic control, armature 40 is moved to the position shown. Thereafter controller 19 is manually moved to command an airspeed. If a difference exists in the positions of rotors 14 and 17, due to a difference between the measured and ordered airspeed, this error signal is applied by way of lead 48, contact 53 and armature 55 to coestat 56 and amplifier 57. The output of amplifier 57 operates motor 58 in a direction to position throttle 59 to change the thrust so as to cause the measured and commanded airspeeds to coincide. Motor 58 continues to displace the throttle 59 until the manifold pressure, as measured by aneroid 61, displaces rotor 62 of transmitter 63 so that the error between the positions of rotors 62 and 67 develops a signal equal and opposite to the input signal to amplifier 57. At this time the net input to amplifier 57 is zero and motor 58 stops.

The error signal from rotor 67 of inductive device 66 is also applied through amplifier 70 to operate motor 68 and drive rotor 67 into positional agreement with rotor 62. However, due to the high gain of the generator, motor 68 can drive rotor 67 only at a slow rate. Thus, when the aircraft reaches an airspeed such that the positions of rotors 14 and 17 coincide, motor 68 will have driven rotor 67 to a position to coincide with the position of rotor 62. The system is now in equilibrium, and any deviation of the craft from this in airspeed operates motor 58 to position the throttle 59 to return the craft to the commanded air speed.

Stops 75 and 76 are provided to limit the airspeeds commanded by controller 19. In addition, a switching arrangement 77 is provided to prevent the actual airspeed of the craft from exceeding a predetermined Mach number.

Switching arrangement 77 is controlled by a Mach sensor 80 comprised of a pitot static tube 81 for feeding one diaphragm assembly 83 and pitot impact 84 for feeding another diaphragm assembly 82. The relative displacement of the bellows is balanced by a suitable means and through a suitable connection displaces the slug 90 of balanced transformer 91. If transformer 91 be unbalanced, the resulting signal is applied through amplifier 92 to the variable phase winding of a conventional induction motor 94 that drives the transformer to a rebalanced position. At the same time, motor 94 also positions the wiper 100 of a potentiometer 101 connected across the center tapped secondary winding 102 of a transformer 103 whose primary winding 104 is energized by a suitable source of alternating current. Motor 94 further positions a switch arm 105 relative to a contact 106. At a preset Mach number, wiper 100 is in a balanced position with respect to potentiometer 101 and switch arm 105 engages control contact 106.

At speeds below the preset Mach number, the Mach limiter has no effect on the operation of the craft. As the speed of the aircraft reaches the preset Mach limit, the wiper 100 of potentiometer 101 is driven to the balance point and switch arm 105 is closed. Direct current by way of contact 107 and armature 108 energizes the solenoid 109 and pulls armatures 55 and 110 downwardly from the position shown. The engagement of armature 110 with contact 112 provides a holding circuit to maintain solenoid 109 energized. The disengagement of armature 55 from contact 53 and its engagement with contact 115 transfers the input through the coestat 56 to servo amplifier 57 from inductive devices 10 and 11 of the airspeed controller to the Mach number signal potentiometer 101 which at this point is balanced. The speed is then controlled to the preset Mach number by signals from potentiometer 101. Any displacement of wiper 100 from its balanced position with respect to potentiometer 101 by motor 94 due to a change in Mach number develops a signal corresponding in phase and amplitude to the direction and extent of change. This signal applied to amplifier 57 operates motor 58 to move throttle 59 to return the craft to the preset Mach number.

During this operation, the airspeed monitor amplifier, which comprises tubes 164 and 165 and which is actually a phase sensitive detector, responds to the phase of the signal on grid 166 from the airspeed controller signal device 11. If this signal has a phase calling for an increase in speed, the amplifier will not operate to energize the solenoid 167. As long as controller 19 calls for a speed greater than the preset Mach limit, solenoid 167 cannot be energized; the Mach limiter will be in command, and motor 94 will move the wiper 100 of potentiometer 101 in such a direction so as to increase airspeed if, due to external reasons, the plane should decrease in speed. Conversely, if the Mach number increases, the potentiometer will generate a signal to decrease the aircraft's speed.

When the human pilot sets controller 19 to command an airspeed or Mach number lower than the preset limit, the airspeed monitor amplifier supplies a signal to energize solenoid 167, thereby pulling armature 108 downwardly from the position shown. Relay 109 is deenergized and control of the throttle will be transferred back to the airspeed controller and sensor which now call for decreased airspeed. Since different displacements of the throttle are necessary for varying conditions of airspeed and altitude, an automatic adjustment device 56, known as a coestat, is provided to isolate the signal chains and adjust the signals as a function of the parameters of flight, Mach number and altitude herein. The coestat is comprised of a conventional pentode 120, a resistancecapacitor coupling 121, a conventional triode 123, and a coupling transformer 124. The signal is applied to the suppressor grid 122 of pentode 120. Applied to the control grid 125 is a signal from a potentiometer 130 whose wiper 131 is positioned by motor 94 as a function of Mach number. To control the excitation of potentiometer 130 as a function of altitude, the compression and expansion of an aneroid 151 of a conventional altitude control in response to a change in altitude positions a slug 152 relative to balanced transformer 153. A signal due to unbalance of the transformer is applied through amplifier 154 to energize the variable phase winding of a motor 155 which drives the transformer 153 to a new balance position through gears 150 and, at the same time, drives a rate generator 156 to provide a signal for damping the operation of the motor. Motor 155 also positions the wiper 160 on a voltage divider 162 whose output is applied to potentiometer 130 of the Mach sensor. The bias corresponding to a function of Mach number and altitude is applied from wiper 131 to the control grid 125 of pentode 120. Thus, the output from pentode 120 corresponds to the command signal modified by a function of altitude and Mach number. This output is applied through a conventional R.C. network 121 to the grid of triode 123, thence by coupling transformer 124 to amplifier 57.

The rate of climb of the craft has a profound influence on the airspeed of the craft. The rate of operation of motor 155 corresponds to the rate at which balanced transformer 153 must be moved to keep the transformer balance, and therefore, is proportional to the rate of ascent or descent of the craft. Rate generator 156 develops a signal at winding 170 corresponding to the rate of operation of the motor 155 and, therefore, to the rate of climb. This signal is applied to the elevator signal chain of the craft.

So that a rate of climb may be commanded, a conventional manual controller 171 displaces the rotor 172 of an inductive device 173 relative to stator 174. The error between the actual and commanded rate of climb is manifest as a difference between the signals of windings 170 and 174. This error signal is applied to an amplifier 176 to operate a servomotor 178 to position the elevator surface 180 and place the craft in an attitude to give the commanded rate of climb or dive. The operation of motor 178 by the error signal is opposed by a follow-up signal corresponding to the displacement of the control surface and by a rate signal which tends to oppose the turning of the craft about the pitch axis. A vertical gyro (not shown) may also be provided for a short-time stabilization if desired since a craft can usually change its attitude faster than it can change its rate of climb or dive.

A portion of the signal corresponding to the error between the measured rate of climb and the commanded rate of climb signals is also applied by way of lead 181 and isolation amplifier 183 and transformer 184 to the thrust control channel. Thus, the thrust is increased as the rate of climb of the craft is increased and is decreased as the rate of climb is decreased.

The foregoing has presented a novel automatic thrust control system for aircraft wherein a desired airspeed may be ordered and the craft maintained at the desired airspeed. The airspeed controller follows the airspeed when the craft is being controlled manually so that the automatic control may be engaged without transients at any time. The stops are provided for minimum and maximum displacements of the controller, and preset means are provided to limit the maximum Mach number of the craft. After the craft once attains this Mach number, the craft is maintained at this Mach number until the manual controller commands an airspeed below the preset Mach number. The novel control system is also provided with means for taking into account the influence of the pitch attitude on the airspeed of the craft.

Although only one embodiment of the invention has been illustrated and described in detail, it is to be expressly understood that the invention is not limited thereto. Various changes can be made in the design and arrangement of the parts without departing from the spirit and scope of the invention as will now be understood by those skilled in the art.

What is claimed:

1. In an aircraft having a power plant thereon including an internal combustion engine having an air intake manifold; the combination comprising a servomotor, means positioned by said servomotor for controlling the thrust developed by said power plant, first signal means for developing a first signal corresponding to the difference between a commanded airspeed and a measured airspeed, means for operatively connecting said first signal developing means to said servomotor so as to operatively control said servomotor by said first signal, second signal means having two displaceable parts for developing a second signal corresponding to the relative displacement of said parts, means responsive to the air intake manifold pressure of said power plant for displacing one of said parts whereby said second signal is developed, said manifold pressure changing with change in the thrust developed by the power plant, means utilizing said second signal for opposing the operation of said servomotor by said first signal, and another servomotor responsive to said second signal for positioning the other part of said second signal means for reducing said second signal in such a manner that said second signal corresponds to the change in the manifold pressure of said power plant due to the change in the developed thrust and whereby as the aircraft attains a measured airspeed corresponding to the commanded airspeed said second signal is reduced to zero.

2. In an aircraft having a power plant thereon including an internal combustion engine having an air intake manifold; the combination comprising a servomotor for controlling the thrust developed by said power plant, first signal means having two displaceable parts for developing a signal corresponding to the relative displacement of said parts, means responsive to measured airspeed for displacing one of said parts, means responsive to commanded airspeed for displacing the other of said parts whereby said first signal corresponds to the difference between the commanded and measured airspeeds, second signal means having two displaceable parts for developing a signal corresponding to the relative displacement of said parts, means responsive to the air intake manifold pressure of said power plant for displacing one of said parts, said manifold pressure changing with change in the thrust developed by the power plant, means for combining said first and second signals in opposed relation to provide a resultant signal for operating said servomotor, and means also responsive to said second signal for positioning the other part of said second signal means to reduce said second signal to zero including means responsive to the rate of positioning of said one part to make said rate of positioning said other part correspond to the magnitude of said second signal and said second signal correspond to the change in the thrust developed by said power plant.

3. In an aircraft having a power plant thereon including an internal combustion engine having an air intake manifold; the combination comprising a servomotor, means positioned by said servomotor for controlling the thrust developed by said power plant, first signal means having two displaceable parts for developing a signal corresponding to the relative displacement of said parts, means responsive to measured airspeed for displacing one of said parts, means responsive to commanded airspeed for displacing the other of said parts whereby said first signal corresponds to the difference between the commanded and measured airspeeds, second signal means having two displaceable parts for developing a signal corresponding to the relative displacement of said parts, means responsive to the air intake manifold pressure of said power plant for displacing one of said parts, said manifold pressure changing with change in the thrust developed by the power plant, means for operatively connecting said first and second signal developing means to said servomotor, said connecting means including means for combining said first and second signals in opposed relation so as to provide a resultant signal for operating said servomotor, another servomotor, other means for operatively connecting said second signal developing means to said other servomotor so that said other servomotor is operatively controlled by said second signal for positioning the other part of said second signal developing means so as to reduce said second signal in such a manner that said second signal corresponds to the change in the manifold pressure of said power plant due to the change in the developed thrust and is reduced to zero upon the aircraft attaining an airspeed corresponding to the commanded airspeed.

4. In an aircraft having a power plant thereon, the combination comprising control means for controlling the thrust developed by said power plant, first signal means having two displaceable parts for developing a first signal corresponding to the relative displacement of said parts, means responsive to measured airspeed for displacing one of said parts, means responsive to commanded airspeed for positioning the other of said parts whereby said first signal corresponds in magnitude and sense to the extent and direction of the difference between the commanded and measured airspeed, second signal means for developing a second signal, means for operating said second signal developing means including means responsive in magnitude and sense to the extent and direction of the difference between a predetermined Mach number and a measured Mach number of the craft, relay means operable in a first sense to operatively connect said first signal developing means to said control means, said relay means operable in a second sense to operatively connect said second signal developing means to said control means, said relay means including first means responsive to said second signal for effecting operation of said relay means in said second sense, and second means responsive to said first signal for effecting operation of said relay means in said first sense, said relay means arranged for operation in said first and second senses so as to effectively control the operation of said control means from said first signal until said craft attains a said predetermined Mach number and thereafter operating said control means from said second signal, and the second means of said relay means responsive to the sense of said first signal for rendering said relay means ineffective to operatively connect said second signal developing means to said control means when an airspeed lower than said predetermined Mach number is commanded.

5. In an aircraft having a power plant thereon, the combination comprising control means for controlling the thrust developed by said power plant, means for developing a first signal, said first signal developing means including means responsive to the difference between a commanded airspeed and the measured airspeed of the craft, means for developing a second signal, said second signal developing means including means responsive to the difference between a predetermined Mach number and the measured Mach number of the craft, and means responsive to said first and second signals for selectively connecting said first and second signal developing means to said control means for operating said control means from said first signal at a Mach number of the craft below said predetermined Mach number and for operating said control means from said second signal when the airspeed of the craft reaches said predetermined Mach number.

6. In an aircraft having a power plant thereon, the combination comprising a servomotor, means operatively connected to said servomotor for controlling the thrust developed by said power plant, first signal means having two displaceable parts for developing a first signal corresponding to the relative displacement of said parts, means responsive to measured airspeed for positioning one of said parts, means responsive to commanded airspeed for positioning the other of said parts whereby said first signal corresponds to the difference between commanded and measured airspeed, second signal means having two parts relatively displaceable from a balanced position for developing a second signal corresponding to the displacement of said parts, means responsive to measured Mach number of the aircraft for positioning one of said parts of said second signal means whereby said second signal corresponds to the difference between the measured Mach number and the Mach number at which said balanced position exists, and means responsive to said first and second signals for selectively connecting said first and second signal developing means to said servomotor for operating said servomotor from said first signal and thereby said thrust control means until a predetermined Mach number is reached and thereafter operating said servomotor from said second signal.

7. In an aircraft having a power plant thereon, including an internal combustion engine having an air intake manifold; the combination comprising control means for controlling the thrust developed by said power plant, means for developing a first signal, said first signal developing means including means responsive to the difference between a commanded airspeed and a measured airspeed, means for developing a second signal, said second signal developing means including means responsive to the change in the air intake manifold pressure of said power plant, said manifold pressure changing with change in the thrust developed by the power plant, means connecting said first and second signals in opposed relation to provide a resultant signal for operating said thrust control means, and means for reducing said second signal in such a manner that said second signal corresponds to the change in the manifold pressure of said power plant due to the change in the developed thrust and whereby, as the aircraft attains a measured airspeed corresponding to the commanded airspeed, said second signal is reduced to zero.

8. In an automatic control system for an aircraft having a throttle controlled power plant; the combination comprising a motor for positioning the throttle of the craft, first means for providing a signal responsive to the difference between an ordered airspeed and a measured airspeed, second means for providing a signal responsive to the difference between a measured Mach number of the craft and a preset Mach number, and means responsive to said first and second signals for selectively shifting the control of said motor from said first means to said second means when said preset Mach number is reached.

9. In an automatic control system for an aircraft having a throttle controlled power plant; the combination comprising a motor for positioning the throttle of the craft, first means for providing a signal responsive to the difference between an ordered airspeed and a measured airspeed, second means for providing a signal responsive to the difference between a measured Mach number of the craft and a preset Mach number, means responsive to said second signal for shifting the control from said first means to said second means when said preset Mach number is reached, and means responsive to said first signal for transferring the control of said motor from said second to said first means when an airspeed lower than said preset Mach number is ordered.

10. An automatic control system for a throttle controlled power plant of an aircraft; comprising a first motor for positioning the throttle of the craft, signal means having two parts relatively movable to develop a signal corresponding to the extent of relative movement from a position of agreement, means responsive to the airspeed of the craft for positioning one of said parts, manually operable means for positioning the other of said parts, means to operatively connect said signal means to said first motor, a second motor, clutch means to drivingly connect said second motor to said manually operable means, selection means including means effective in one mode of operation to effectively connect said signal means to said second motor for rendering said second motor effective to position said manually operable means through said clutch means so as to maintain said signal means parts in positioned agreement, and said selection means including means effective in another mode of operation for rendering said second motor ineffective on said manually operable means and whereupon the signal developed by said signal means is effective to control said first motor so as to position said throttle to control the airspeed of the craft so as to maintain said signal means parts in positional agreement.

11. An automatic control system for aircraft, comprising power means for controlling thrust of an aircraft, means responsive to the airspeed of the craft for developing a corresponding control signal for said power means, means operatively connecting said airspeed responsive means and said power means, means responsive to Mach number of the aircraft, other means responsive to altitude of the aircraft, and other means operatively connecting said Mach number responsive means and said altitude responsive means to said first-mentioned connecting means in such a manner as to modify said control signal as a function of prevailing Mach number and altitude of the aircraft.

12. The combination defined by claim 11 including means responsive to prevailing rate of climb of the aircraft, operator-operative means for selecting the rate of climb of the aircraft, and additional means operatively connecting said rate of climb responsive means and said rate of climb selecting means to said first connecting means in such a manner as to modify the control signal in a sense tending to cause the thrust of the aircraft to be varied so as to cause the prevailing rate of climb of the aircraft to correspond to the selected rate of climb.

13. An automatic control system for aircraft, comprising power means for controlling thrust of an aircraft, means responsive to the airspeed of the craft for developing a corresponding control signal for said power means, means operatively connecting said airspeed responsive means and said power means, means responsive to rate of climb of said aircraft, operator-operative means for selecting the rate of climb of the aircraft, and other means operatively connecting said rate of climb responsive means and said rate of climb selecting means to said first connecting means in such a manner as to modify the control signal in a sense tending to cause the thrust of the aircraft to be varied so as to cause the prevailing rate of climb of the aircraft to correspond to the selected rate of climb.

14. An automatic control system for an aircraft having a movable control surface for regulating the rate of climb of the aircraft and a throttle controlled power plant for regulating thrust of the aircraft, comprising power means for positioning the throttle to regulate the thrust of the aircraft, means responsive to the airspeed of the craft for developing a corresponding control signal for said power means, means operatively connecting said airspeed responsive means and said power means, means responsive to prevailing rate of climb of said aircraft for developing a second signal, manually operable means for developing a third signal corresponding to a commanded rate of climb, other means for operatively connecting the second and third signals in opposing relation and to said first connecting means in such a manner as to modify the control signal in a sense tending to cause the thrust of the aircraft to be varied so as to cause the prevailing rate of climb of the aircraft to correspond to the commanded rate of climb, and other power means for moving said control surface, said other power means controlled by the difference between the second and third signals so as to cause said other power means to position said control surface so as to place said aircraft in an attitude to cause the prevailing rate of climb to correspond to the commanded rate of climb.

References Cited in the file of this patent
UNITED STATES PATENTS

| | | |
|---|---|---|
| 2,233,307 | Dodson | Feb. 25, 1941 |
| 2,252,693 | Becker | Aug. 19, 1941 |
| 2,496,294 | Kellogg | Feb. 7, 1950 |